(12) United States Patent
Tang

(10) Patent No.: US 11,259,305 B2
(45) Date of Patent: Feb. 22, 2022

(54) BANDWIDTH PART CONFIGURATION METHOD, NETWORK DEVICE, AND TERMINAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/021,772

(22) Filed: Sep. 15, 2020

(65) Prior Publication Data

US 2020/0413406 A1  Dec. 31, 2020

Related U.S. Application Data

(63) Continuation of application No. 16/698,888, filed on Nov. 27, 2019, now abandoned, which is a (Continued)

(51) Int. Cl.
*H04W 72/04* (2009.01)
*H04W 28/20* (2009.01)
(Continued)

(52) U.S. Cl.
CPC ....... *H04W 72/0453* (2013.01); *H04L 5/0007* (2013.01); *H04L 5/0028* (2013.01);
(Continued)

(58) Field of Classification Search
CPC .......... H04W 72/0453; H04W 72/042; H04W 28/20; H04W 72/02; H04L 5/0053; H04L 5/0064; H04L 5/0007; H04L 5/0028
See application file for complete search history.

(56) References Cited

U.S. PATENT DOCUMENTS

2012/0320961 A1  12/2012  Pham
2014/0044083 A1  2/2014  Kim
(Continued)

FOREIGN PATENT DOCUMENTS

CN       1501592 A     6/2004
CN     102687441 A     9/2012
(Continued)

OTHER PUBLICATIONS

Qualcomm Incorporated. "Carrier segments and NCT", 3GPP TSG-RAN WGI #72, R1-130580. Feb. 1, 2013 (Feb. 1, 2013), entire document.
(Continued)

*Primary Examiner* — Omar J Ghowrwal

(57) ABSTRACT

A bandwidth part configuration method, a network device, and a terminal are provided. In the method, configuration information is obtained, the configuration information being used for configuring at least one frequency-domain bandwidth configuration, the size and/or the position of a bandwidth part configured by each of the at least one frequency-domain bandwidth configuration being defined by using a same frequency-domain unit as a unit, the frequency-domain unit comprising N resource blocks, and N being an integer greater than or equal to 1; and the configuration information is sent.

27 Claims, 5 Drawing Sheets

Receiving configuration information, the configuration information being used to configure at least one frequency-domain bandwidth configuration, a magnitude and/or position of a bandwidth part configured by each of the at least one frequency-domain bandwidth configuration being defined by adopting the same frequency-domain unit as a unit, the frequency-domain unit including N RBs and N being an integer more than or equal to 1 — 201

Determining the at least one frequency-domain bandwidth configuration according to the configuration information — 202

Related U.S. Application Data continuation of application No. PCT/CN2017/088056, filed on Jun. 13, 2017.

(51) Int. Cl.
*H04L 5/00* (2006.01)
*H04W 72/02* (2009.01)

(52) U.S. Cl.
CPC .......... *H04L 5/0053* (2013.01); *H04L 5/0064* (2013.01); *H04W 28/20* (2013.01); *H04W 72/02* (2013.01); *H04W 72/042* (2013.01)

(56) References Cited

U.S. PATENT DOCUMENTS

| | | | |
|---|---|---|---|
| 2015/0078284 A1 | 3/2015 | Lee et al. | |
| 2016/0352551 A1 | 12/2016 | Zhang | |
| 2018/0288746 A1* | 10/2018 | Zhang | H04L 1/0031 |
| 2020/0252922 A1* | 8/2020 | Fujishiro | H04W 72/042 |

FOREIGN PATENT DOCUMENTS

| | | | |
|---|---|---|---|
| CN | 103973392 A | 8/2014 | |
| RU | 2558680 C2 | 8/2015 | |
| WO | 2011083876 A1 | 7/2011 | |
| WO | 2011084822 A1 | 7/2011 | |
| WO | 2017088833 A1 | 6/2017 | |

OTHER PUBLICATIONS

Huawei et al: "On bandwidth part and bandwidth adaptation" 3GPP Draft: R1-1706900. 3rd Generation Partnership Project (3GPP), vol. RAN WG1, No. Hangzhou, China;May 15, 2017-2017051914 May 2017 (May 14, 2017), XP051272131, Retrieved from the Internet: URL: http://www.3gpp. org/ftp/Meetings 3GPP SYNC/RAN1/Docs/-3 [ retrieved on May 14, 2017]section 2 Wideband Operation, sub-section a Number of subcarriers ** section 4 Possible properties of bandwidth part * * section 6 Indication of bandwidth part *.
Mediatek Inc: "Efficient Wider Bandwidth Operations for NR" 3GPP Draft: R1-1707828 Efficient Wider Bandwidth Operations for NR, 3rd Generation Partnership Project (3GPP) vol. RAN WG1, No. Hangzhou, China; May 15, 2017-2017051914 May 2017 (May 14, 2017), XP051273029, Retrieved from the Internet: URL http://www.3gpp. org/ftp/Meetings 3GPP SYNC/RAN1/Docs/ [ retrieved on May 14, 2017]* section 3 Efficient Single Carrier Operation *.
Interdigital: "DL data scheduling" 3GPP Draft: R1-1709010, 3rd Generation Partnership Project (3GPP), vol. RAN WG1, No. Hangzhou; 201705152017051914 May 2017 (May 14, 2017), XP051274172, Retrieved from the Internet: URL: http://www.3gpp. org/ftp/Meetings 3GPP SYNC/RAN1/Docs/ [ retrieved on May 14, 2017] * Section 2 DL Data Scheduling *.
LG Electronics, OPPO, ASUSTEK, Ericsson, Intel,DOCOMO, Huawei, HiSilicon, . . . "WF on PRB grid structure for wider bandwidth operation",3GPP TSG RAN1 #89 R1-1709625 (2017-05-018).
International Search Report in the international application No. PCT/CN2017/088056, dated Feb. 28, 2018.
English Translation of the Written Opinion of the International Search Authority in the international application No. PCT/CN2017/088056, dated Feb. 28, 2018.
Supplementary European Search Report in the European application No. 17913269.1, dated Apr. 8, 2020.
Notice of Allowance of the Russian application No. 2019141848, dated Aug. 20, 2020.
First Office Action of the European application No. 17913269.1, dated Nov. 5, 2020.
First Office Action of the Chinese application No. 201911324534.9, dated Nov. 3, 2020.
First Office Action of the Chilean application No. 201903524, dated Jan. 19, 2021.
First Office Action of the Canadian application No. 3066295, dated Feb. 11, 2021.
First Office Action of the Indian application No. 201917052048, dated Apr. 20, 2021.
Second Office Action of the European application No. 17913269.1, dated May 14, 2021.
First Office Action of the Taiwanese application No. 107118395, dated Jul. 15, 2021.
Intel Corporation, "Bandwidth Parts Configuration and Operations", R1-1707420, 3GPP TSG RAN WG1 Meeting #89, Hangzhou, China, May 15-19, 2017, 5 pages.
Guangdong OPPO Mobile Telecom, "DL Resource Allocation and Indication for NR," R1-1701960, 3GPP TSG RAN WG1 Meeting #88, Athens, Greece, Feb. 13-17, 2017, 4 pages.
MediaTek Inc., "Discussion on PBCH design," R1-1707816, 3GPP TSG RAN WG1 Meeting #89, Hangzhou, P.R. China, May 15-19, 2017, 7 pages.
First Office Action of the Japanese application No. 2019-566136, dated Jul. 16, 2021.
First Office Action of the Korean application No. 10-2019-7036094, dated Aug. 20, 2021.
Third Office Action of the European application No. 17913269.1, dated Nov. 9, 2021.
Second Office Action of the Canadian application No. 3066295, dated Dec. 3, 2021.
Second Office Action of the Chilean application No. 201903524, dated Oct. 15, 2021.

* cited by examiner

BANDWIDTH PART CONFIGURATION METHOD, NETWORK DEVICE, AND TERMINAL

CROSS-REFERENCE TO RELATED APPLICATIONS

The application is a continuation of U.S. patent application Ser. No. 16/698,888 filed on Nov. 27, 2019, which is a continuation application of International Patent Application No. PCT/CN2017/088056, filed on Jun. 13, 2017, the contents of which are hereby incorporated by reference in its entirety.

BACKGROUND

In a New Radio (NR) system, for example, a 5th-Generation (5G) application scenario, it has been decided to introduce the concept of bandwidth part to implement frequency-domain resource allocation within a range smaller than a system bandwidth. Each bandwidth part may be bound with a subcarrier spacing, and different bandwidth parts may be switched to implement resource allocation of multiple subcarrier spacings.

Therefore, how to reasonably configure a bandwidth part to ensure a relatively low control signaling overhead is a problem urgent to be solved.

SUMMARY

The disclosure relates to radio access technologies, and more particularly to a bandwidth part configuration method, a network device and a terminal.

Multiple aspects of the disclosure provide a bandwidth part configuration method, a network device and a terminal, to ensure a relatively low control signaling overhead.

One aspect of the disclosure provides a bandwidth part configuration method, which may include the following operations.

Configuration information is obtained, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N Resource Blocks (RBs) and N being an integer more than or equal to 1.

The configuration information is sent.

Another aspect of the disclosure provides another bandwidth part configuration method, which may include the following operations.

Configuration information is received, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N RBs and N being an integer more than or equal to 1.

The at least one frequency-domain bandwidth configuration is determined according to the configuration information.

Another aspect of the disclosure provides a network device, which may include an obtaining unit and a sending unit.

The obtaining unit may be configured to obtain configuration information, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N RBs and N being an integer more than or equal to 1.

The sending unit may be configured to send the configuration information.

Another aspect of the disclosure provides a terminal, which may include a receiving unit and a determination unit.

The receiving unit may be configured to receive configuration information, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N RBs and N being an integer more than or equal to 1.

The determination unit may be configured to determine the at least one frequency-domain bandwidth configuration according to the configuration information.

From the technical solutions, it can be seen that, on one hand, in the embodiments of the disclosure, the configuration information is obtained, the configuration information being used to configure the at least one frequency-domain bandwidth configuration, the size and/or position of the bandwidth part configured by each of the at least one frequency-domain bandwidth configuration being defined by adopting the same frequency-domain unit as the unit, the frequency-domain unit including the N RBs and N being an integer more than or equal to 1, and the configuration information is further sent. The size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby effectively ensuring a relatively low control signaling overhead and reducing device complexity.

From the technical solutions, it can be seen that, on the other hand, in the embodiments of the disclosure, the configuration information is received, the configuration information being used to configure the at least one frequency-domain bandwidth configuration, the size and/or position of the bandwidth part configured by each of the at least one frequency-domain bandwidth configuration being defined by adopting the same frequency-domain unit as the unit, the frequency-domain unit including the N RBs and N being an integer more than or equal to 1, and the at least one frequency-domain bandwidth configuration is further determined according to the configuration information. The size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby effectively ensuring a relatively low control signaling overhead and reducing device complexity.

In addition, with adoption of the technical solutions provided in the disclosure, the size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby reducing processing complexity of a terminal.

Moreover, with adoption of the technical solutions provided in the disclosure, a maximum subcarrier spacing in subcarrier spacings of the bandwidth parts configured by each frequency-domain bandwidth configuration is adopted as a subcarrier spacing of the RB, which, compared with adoption of a relatively small subcarrier spacing as the subcarrier spacing of the RB, may effectively reduce a bit number for configuration of the bandwidth parts and reduce the control signaling overhead.

BRIEF DESCRIPTION OF DRAWINGS

In order to describe the technical solutions in the embodiments of the disclosure more clearly, the drawings required to be used in descriptions about the embodiments or a conventional art will be simply introduced below. It is apparent that the drawings described below are some embodiments of the disclosure. Other drawings may further be obtained by those of ordinary skill in the art according to these drawings without creative work.

DETAILED DESCRIPTION

In order to make the purpose, technical solutions and advantages of the embodiments of the disclosure clearer, the technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

In an NR system, for example, a 5G system, a downlink multiple access manner is usually an Orthogonal Frequency Division Multiple Access (OFDMA) manner. A downlink resource of a system is divided into Orthogonal Frequency Division Multiple (OFDM) symbols from time, and is divided into subcarriers from frequency.

Under a 15 kHz subcarrier spacing, a normal downlink subframe includes two slots, each slot includes 7 or 6 OFDM symbols, and a normal downlink subframe includes totally 14 OFDM symbols or 12 OFDM symbols. The Long Term Evolution (LTE) Release 8/9/10 standard further defines a size of an RB. An RB includes 12 subcarriers on a frequency domain, and is a half subframe duration (i.e., a slot) on a time domain, namely including 7 or 6 OFDM symbols. Resource Element (RE) is a minimum resource unit in physical resources.

Various data born in a subframe is organized and mapped by dividing various physical channels on physical time-frequency resources of the subframe. The physical channels may generally be divided into two types: control channels and service channels. Correspondingly, data born in a control channel may be called control data (which may usually be called control information), and data born in a service channel may be called service data (which may usually be called data). A fundamental objective of sending a subframe is to transmit service data, and a function of a control channel is to assist in transmission of the service data.

When control data is transmitted, RE is a minimum transmission unit. However, an RE is too small. Therefore, Resource Element Group (REG) or Control Channel Element (CCE) is used as a transmission unit in many cases.

In addition, term "and/or" in the disclosure is only an association relationship describing associated objects and represents that three relationships may exist. For example, A and/or B may represent three conditions: i.e., independent existence of A, existence of both A and B and independent existence of B. In addition, character "I" in the disclosure usually represents that previous and next associated objects form an "or" relationship.

Figure 1A:
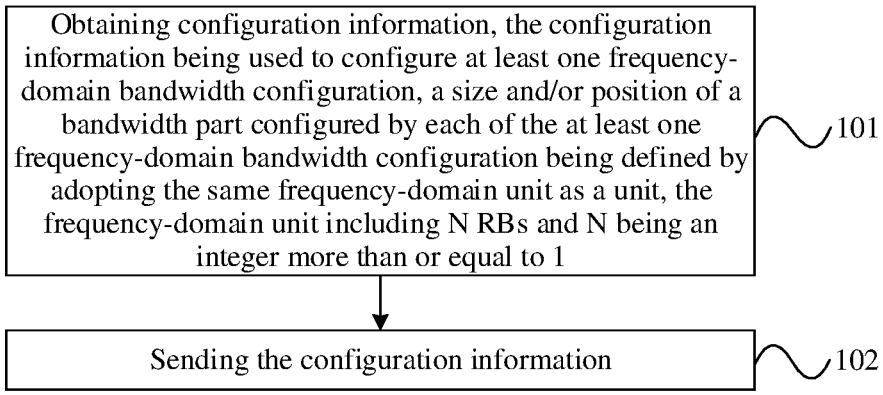
FIG. 1A is a flowchart of a bandwidth part configuration method according to an embodiment of the disclosure.

FIG. 1A is a flowchart of a bandwidth part configuration method according to an embodiment of the disclosure, as shown in FIG. 1A.

In 101, configuration information is obtained, the configuration information being used to configure at least one frequency-domain bandwidth configuration, a size and/or position of a bandwidth part configured by each of the at least one frequency-domain bandwidth configuration being defined by adopting the same frequency-domain unit D as a unit, the frequency-domain unit D including N RBs and N being an integer more than or equal to 1.

In 102, the configuration information is sent.

It is to be noted that an execution body of 101-102 may be a network device.

Optionally, in a possible implementation mode of the embodiment, the bandwidth part configured by each frequency-domain bandwidth configuration has the same subcarrier spacing or different subcarrier spacings. There are no particular limits made thereto in the embodiment.

In such a manner, different bandwidth parts may be switched to implement resource allocation of multiple subcarrier spacings.

Optionally, in a possible implementation mode of the embodiment, a subcarrier spacing of the RB may be any subcarrier spacing in the subcarrier spacings of the bandwidth part configured by each frequency-domain bandwidth configuration.

Optionally, in a possible implementation mode of the embodiment, the subcarrier spacing of the RB is a maximum subcarrier spacing in the subcarrier spacings of the bandwidth part configured by each frequency-domain bandwidth configuration.

Therefore, with adoption of the technical solutions provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce a control signaling overhead.

Optionally, in a possible implementation mode of the embodiment, the size of the bandwidth part configured by each frequency-domain bandwidth configuration may be the number of frequency-domain units D in the bandwidth part configured by the frequency-domain bandwidth configuration.

Optionally, in a possible implementation mode of the embodiment, the position of the bandwidth part configured by each frequency-domain bandwidth configuration is a relative offset of the bandwidth part configured by the frequency-domain bandwidth configuration relative to a synchronization signal or a cell carrier, the relative offset being defined by adopting the frequency-domain unit.

In such a manner, the position of the bandwidth part may be configured by adopting the offset relative to the synchronization signal, and a terminal may obtain information about a position of a bandwidth part 1 without learning a system bandwidth, so that a control signaling overhead in notifying the terminal of the system bandwidth by the network device may be effectively reduced, and bandwidth part configuration flexibility is improved. Particularly for a terminal with a relatively small radio frequency bandwidth, the terminal is not required to search a position of the system bandwidth, so that a requirement on processing complexity of the terminal is also reduced, and reduction in cost and power consumption of the terminal is facilitated.

In a specific implementation process, the relative offset may be an offset of a center frequency point, frequency-domain high end or frequency-domain low end of the bandwidth part configured by each frequency-domain bandwidth configuration relative to a center frequency point, frequency-domain high end or frequency-domain low end of the synchronization signal, for example, the offset of the center frequency point of the bandwidth part configured by each frequency-domain bandwidth configuration relative to the center frequency point of the synchronization signal, or, for another example, the offset of the center frequency point of the bandwidth part configured by each frequency-domain bandwidth configuration relative to the frequency-domain high end of the synchronization signal, or, for another example, the offset of the center frequency point of the bandwidth part configured by each frequency-domain bandwidth configuration relative to the frequency-domain low end of the synchronization signal, or, for another example, the offset of the frequency-domain high end of the bandwidth part configured by each frequency-domain bandwidth configuration relative to the center frequency point of the synchronization signal, or, for another example, the offset of the frequency-domain high end of the bandwidth part configured by each frequency-domain bandwidth configuration relative to the frequency-domain high end of the synchronization signal, or, for another example, the offset of the frequency-domain high end of the bandwidth part configured by each frequency-domain bandwidth configuration relative to the frequency-domain low end of the synchronization signal, or, for another example, the offset of the frequency-domain low end of the bandwidth part configured by each frequency-domain bandwidth configuration relative to the center frequency point of the synchronization signal, or, for another example, the offset of the frequency-domain low end of the bandwidth part configured by each frequency-domain bandwidth configuration relative to the frequency-domain high end of the synchronization signal, or, for another example, the offset of the frequency-domain low end of the bandwidth part configured by each frequency-domain bandwidth configuration relative to the frequency-domain low end of the synchronization signal.

In another specific implementation process, the relative offset may be an offset of the center frequency point, frequency-domain high end or frequency-domain low end of the bandwidth part configured by each frequency-domain bandwidth configuration relative to a center frequency point, frequency-domain high end or frequency-domain low end of the cell carrier, for example, the offset of the center frequency point of the bandwidth part configured by each frequency-domain bandwidth configuration relative to the center frequency point of the cell carrier, or, for another example, the offset of the center frequency point of the bandwidth part configured by each frequency-domain bandwidth configuration relative to the frequency-domain high end of the cell carrier, or, for another example, the offset of the center frequency point of the bandwidth part configured by each frequency-domain bandwidth configuration relative to the frequency-domain low end of the cell carrier, or, for another example, the offset of the frequency-domain high end of the bandwidth part configured by each frequency-domain bandwidth configuration relative to the center frequency point of the cell carrier, or, for another example, the offset of the frequency-domain high end of the bandwidth part configured by each frequency-domain bandwidth configuration relative to the frequency-domain high end of the cell carrier, or, for another example, the offset of the frequency-domain high end of the bandwidth part configured by each frequency-domain bandwidth configuration relative to the frequency-domain low end of the cell carrier, or, for another example, the offset of the frequency-domain low end of the bandwidth part configured by each frequency-domain bandwidth configuration relative to the center frequency point of the cell carrier, or, for another example, the offset of the frequency-domain low end of the bandwidth part configured by each frequency-domain bandwidth configuration relative to the frequency-domain high end of the cell carrier, or, for another example, the offset of the frequency-domain low end of the bandwidth part configured by each frequency-domain bandwidth configuration relative to the frequency-domain low end of the cell carrier.

Optionally, in a possible implementation mode of the embodiment, the configuration information obtained in 101 may further include at least one of:

serial number information of each frequency-domain bandwidth configuration; and information about the subcarrier spacings of the bandwidth part configured by each frequency-domain bandwidth configuration.

In an embodiment, the information about the subcarrier spacings of the bandwidth part configured by each frequency-domain bandwidth configuration may be information of serial numbers of the subcarrier spacings of the bandwidth part configured by each frequency-domain bandwidth configuration, or may also be information of a serial number of a parameter set of the bandwidth part configured by each frequency-domain bandwidth configuration, the parameter set of the bandwidth part configured by each frequency-domain bandwidth configuration at least including a subcarrier spacing and cyclic prefix of the bandwidth part configured by each frequency-domain bandwidth configuration, for example, a parameter set 1 (subcarrier spacing 1, cyclic prefix 1) and a parameter set 2 (subcarrier spacing 2, cyclic prefix 2). There are no particular limits made thereto in the embodiment.

Optionally, in a possible implementation mode of the embodiment, in 102, the configuration information may specifically be sent through high-layer signaling or a system broadcast message.

In an embodiment, the network device may specifically send the configuration information to the terminal through the high-layer signaling or the system broadcast message.

For example, the high-layer signaling may be a Radio Resource Control (RRC) message, and the configuration information may specifically be contained through an Information Element (IE) in the RRC message. The RRC message may be an RRC message in the conventional art, for example, an RRC connection reconfiguration message, and there are no limits made thereto in the embodiment. An IE of an existing RRC message is extended to contain the configuration information. Or the RRC message may also be different from the existing RRC message in the conventional art.

For another example, the high-layer signaling may be a Media Access Control (MAC) Control Element (CE) message, and a new MAC CE message may also specifically be added to contain the configuration information.

For another example, the configuration information may specifically be contained by a spare bit in an existing Master Information Block (MIB) or System Information Block (SIB) in the system broadcast message, and a new SIB may also be added to contain the configuration information.

It can be understood that high-layer signaling or system broadcast message involved in the subsequent embodiments may all be understood in the same manner.

Optionally, in a possible implementation mode of the embodiment, first indication information may further be sent, the first indication information including information of a serial number indicating one frequency-domain bandwidth configuration in the at least one frequency-domain bandwidth configuration. Therefore, the specific frequency-domain bandwidth configuration may be indicated to the terminal.

In an embodiment, the first indication information may specifically be sent through high-layer signaling or a system broadcast message or Downlink Control Information (DCI).

Optionally, in a possible implementation mode of the embodiment, second indication information may further be sent, the second indication information including frequency-domain resource allocation information based on one frequency-domain bandwidth configuration in the at least one frequency-domain bandwidth configuration. Therefore, specific frequency-domain resource allocation information of the specific frequency-domain bandwidth configuration may be indicated to the terminal.

In an embodiment, the second indication information may specifically be sent through high-layer signaling or a system broadcast message or DCI.

For making the method provided in the embodiment of the disclosure clearer, the condition that a size of the frequency-domain unit D is 2 60 kHz RBs, namely D=2RB, will be taken as an example below.

Figure 1B:
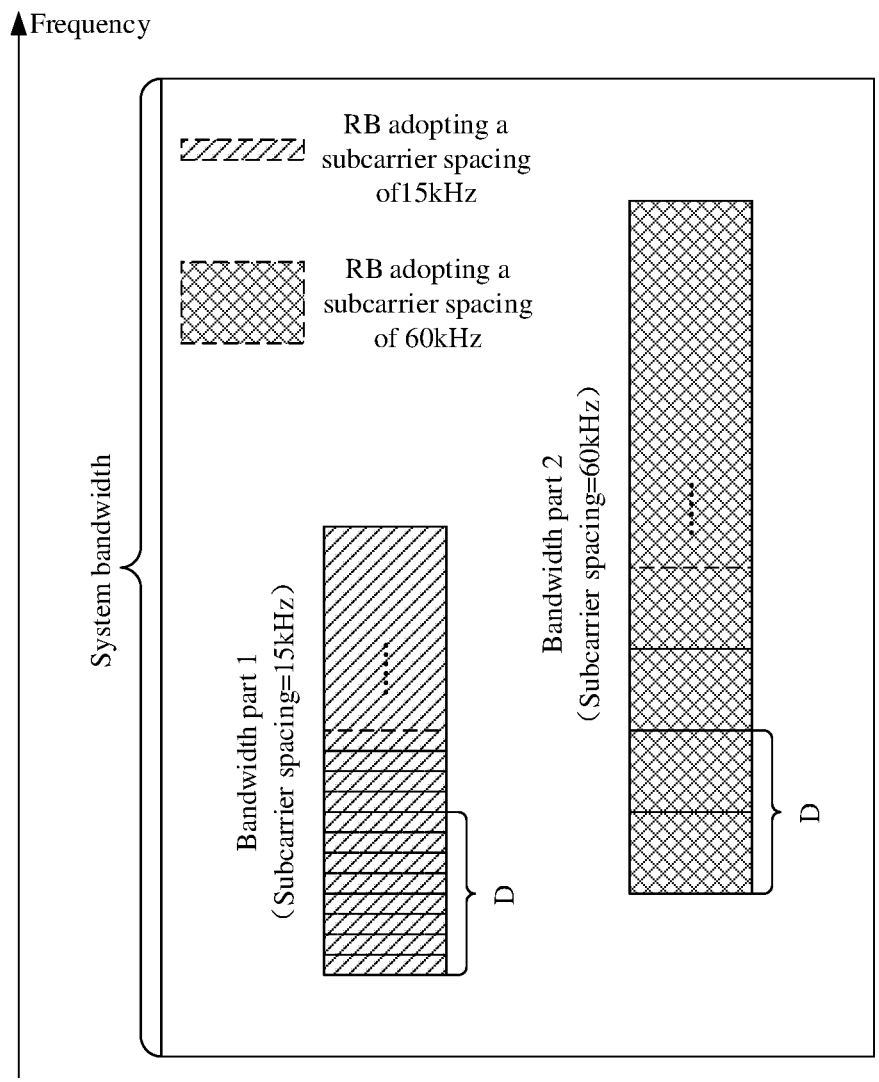
FIG. 1B is a distribution schematic diagram of a frequency-domain bandwidth configuration according to the embodiment corresponding to FIG. 1A.

FIG. 1B is a distribution schematic diagram of a frequency-domain bandwidth configuration according to the embodiment corresponding to FIG. 1A. As shown in FIG. 1B, the network device makes two frequency-domain bandwidth configurations for the terminal through first configuration information, each frequency-domain bandwidth configuration configuring a bandwidth part smaller than a system bandwidth for specific frequency-domain resource allocation. A bandwidth part 1 is a bandwidth part adopting a 15 kHz subcarrier spacing, one RB includes 12 subcarriers, and a bandwidth is 180 kHz. A bandwidth part 2 is a bandwidth part adopting a 60 kHz subcarrier spacing, one RB includes 12 subcarriers, and a bandwidth is 720 kHz. When the bandwidth parts of the two frequency-domain bandwidth configurations are configured, the same frequency-domain unit D is adopted for configuration, D=2 RBs adopting the 60 kHz subcarrier spacing, and a bandwidth is 1,440 kHz.

With adoption of such a configuration method, for configuration of the bandwidth part adopting any subcarrier spacing for the terminal, the same resource granularity, i.e., the frequency-domain unit D, may be adopted for configuration, which, compared with configuration of bandwidth parts by adopting different resource granularities, may unify control signaling structures, effectively ensure a relatively low control signaling overhead and, meanwhile, reduce processing complexity of the terminal.

RBs corresponding to the maximum subcarrier spacing and a multiple thereof are adopted as the frequency-domain unit D, which, compared with adoption of RBs corresponding to a relatively small subcarrier spacing and a multiple thereof as the frequency-domain unit D, may reduce a bit number for configuration of the bandwidth parts and reduce the control signaling overhead.

Figure 1C:
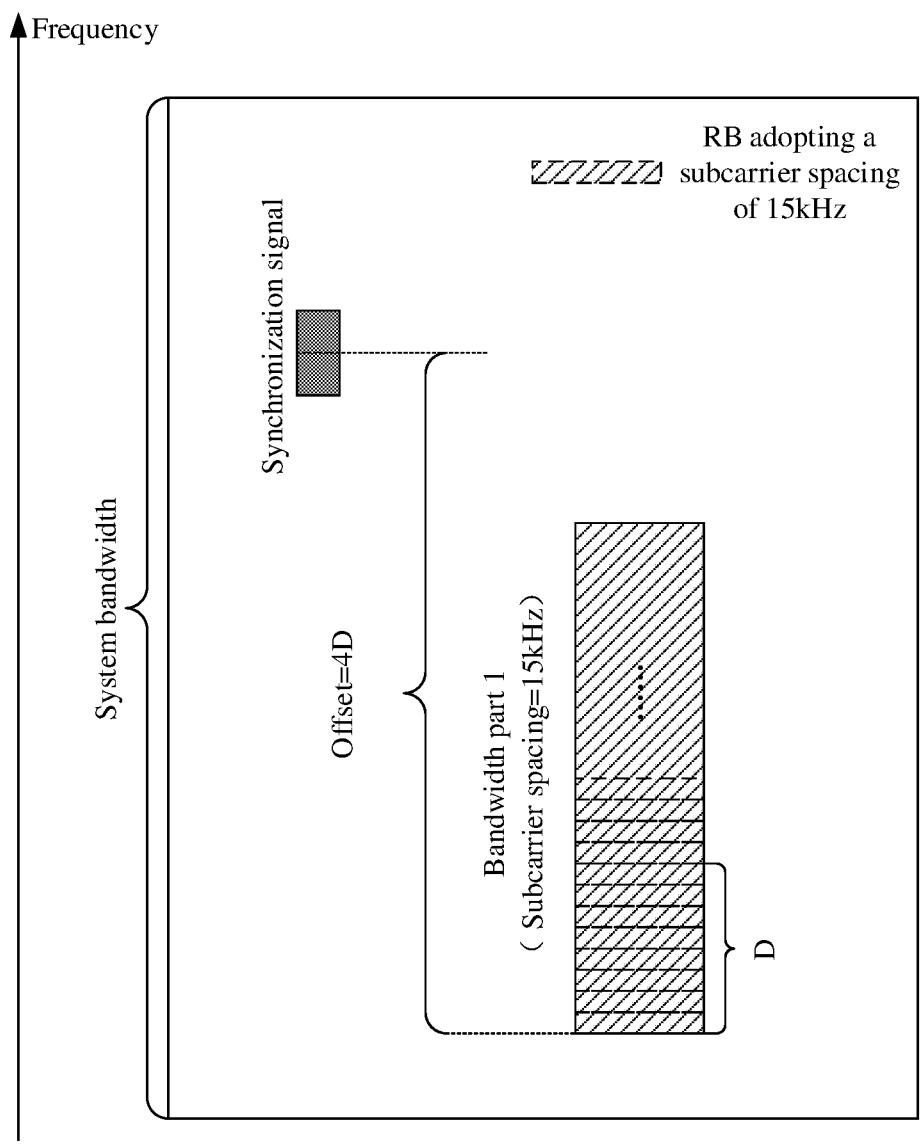
FIG. 1C is a distribution schematic diagram of another frequency-domain bandwidth configuration according to the embodiment corresponding to FIG. 1A.

FIG. 1C is a distribution schematic diagram of another frequency-domain bandwidth configuration according to the embodiment corresponding to FIG. 1A. As shown in FIG. 1C, compared with FIG. 1B, a position of the bandwidth part 1 in FIG. 1B may specifically be indicated, an offset of a frequency-domain low end of the bandwidth part 1 relative to the center frequency point of the synchronization signal is adopted to configure the position of the bandwidth part 1, the frequency-domain unit D is adopted as a frequency-domain granularity for configuration, and the offset is 4D.

With adoption of such a configuration method, the terminal may obtain information about the position of the bandwidth part 1 without learning the system bandwidth, so that a control signaling overhead in notifying the terminal of the system bandwidth by the network device may be effectively reduced, and bandwidth part configuration flexibility is improved. Particularly for a terminal with a relatively small radio frequency bandwidth, the terminal is not required to search a position of the system bandwidth, so that a requirement on processing complexity of the terminal is also reduced, and reduction in cost and power consumption of the terminal is facilitated.

Figure 1D:
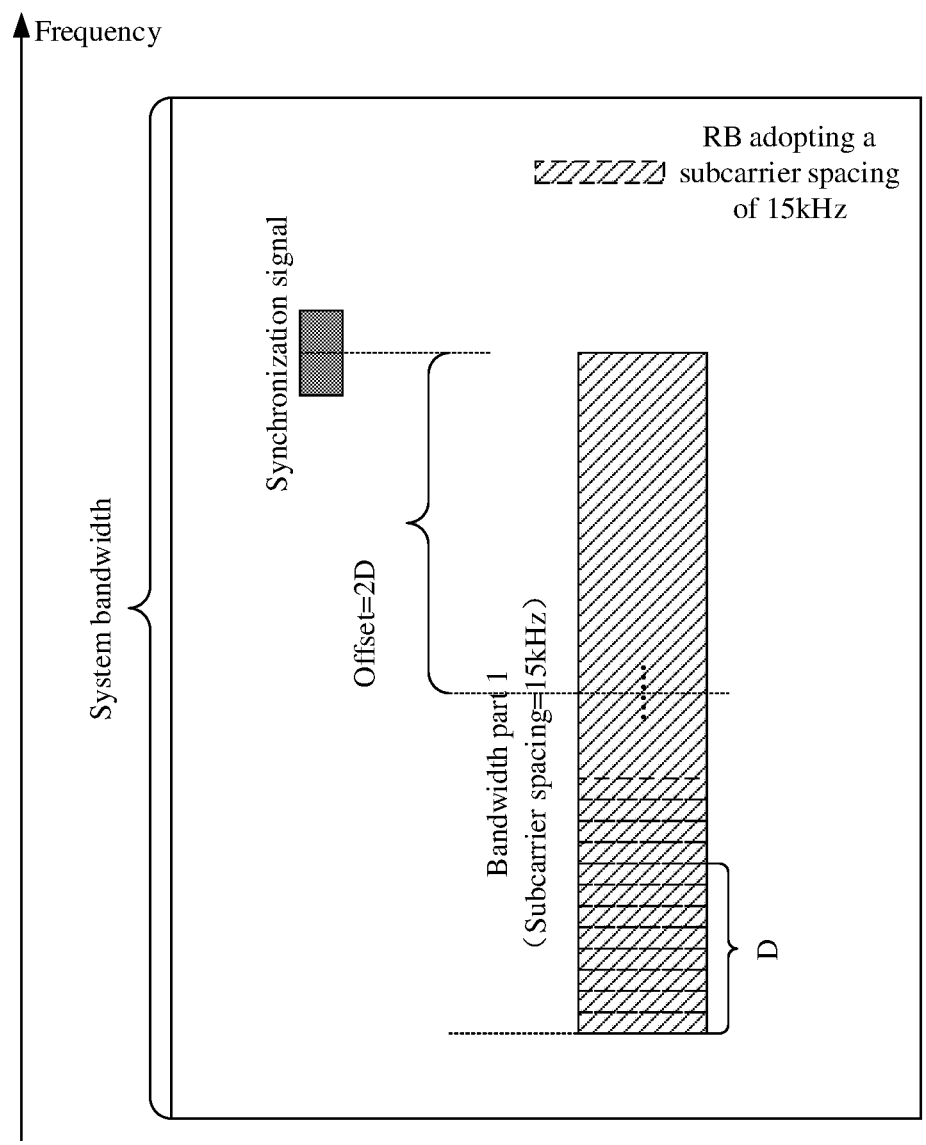
FIG. 1D is a distribution schematic diagram of another frequency-domain bandwidth configuration according to the embodiment corresponding to FIG. 1A.

FIG. 1D is a distribution schematic diagram of another frequency-domain bandwidth configuration according to the embodiment corresponding to FIG. 1A. As shown in FIG. 1D, compared with FIG. 1B, the position of the bandwidth part 1 in FIG. 1B may specifically be indicated, an offset of a center frequency point of the bandwidth part 1 relative to the center frequency point of the synchronization signal is adopted to configure the position of the bandwidth part 1, the frequency-domain unit D is adopted as a frequency-domain granularity for configuration, and the offset is 2D.

With adoption of such a configuration method, the terminal may obtain the information about the position of the bandwidth part 1 without learning the system bandwidth, so that the control signaling overhead in notifying the terminal of the system bandwidth by the network device may be effectively reduced, and the bandwidth part configuration flexibility is improved. Particularly for a terminal with a relatively small radio frequency bandwidth, the terminal is not required to search the position of the system bandwidth, so that a requirement on processing complexity of the terminal is also reduced, and reduction in cost and power consumption of the terminal is facilitated.

Figure 1E:
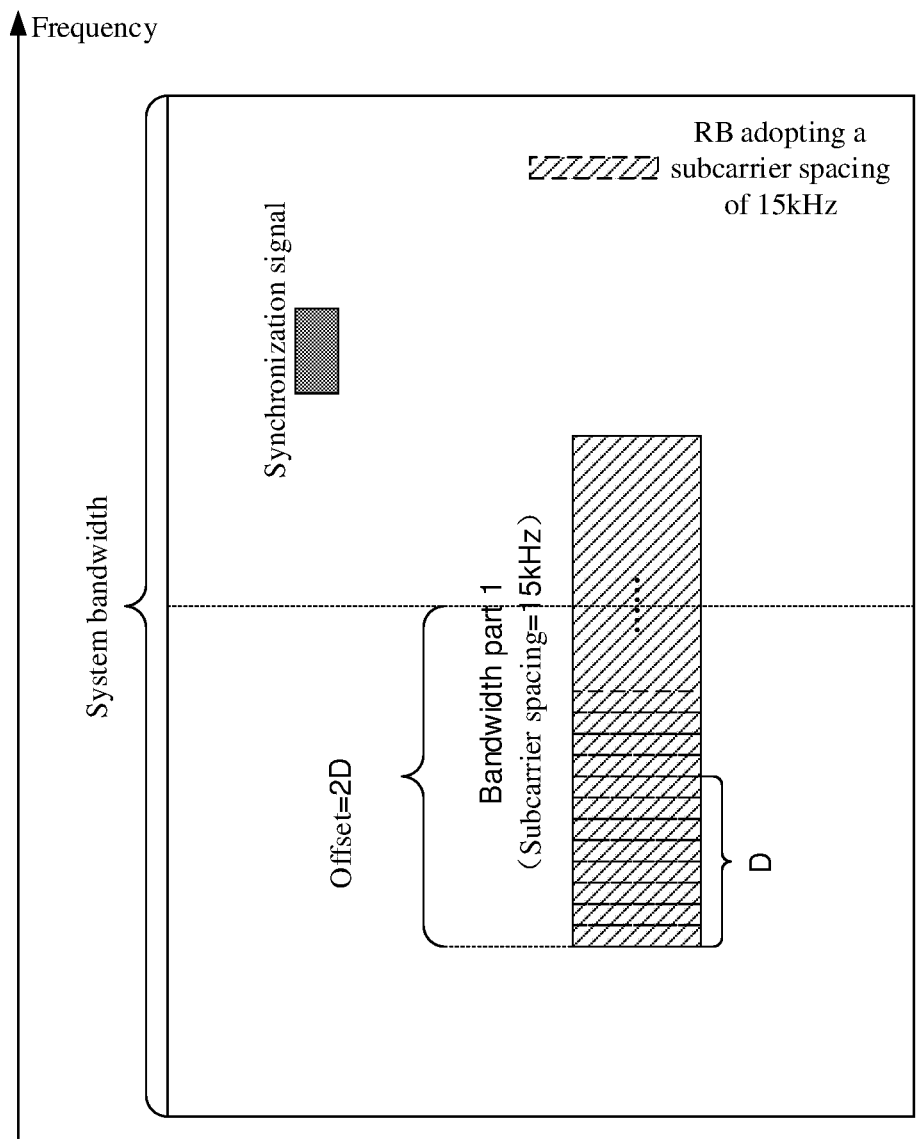
FIG. 1E is a distribution schematic diagram of another frequency-domain bandwidth configuration according to the embodiment corresponding to FIG. 1A.

FIG. 1E is a distribution schematic diagram of another frequency-domain bandwidth configuration according to the embodiment corresponding to FIG. 1A. As shown in FIG. 1E, compared with FIG. 1B, the position of the bandwidth part 1 in FIG. 1B may specifically be indicated, an offset of the frequency-domain low end of the bandwidth part 1 relative to the center frequency point of the cell carrier is adopted to configure the position of the bandwidth part 1, the frequency-domain unit D is adopted as a frequency-domain granularity for configuration, and the offset is 2D.

With adoption of such a configuration method, positions of bandwidth parts 1 for all terminals in a cell are configured relative to the center frequency point of the cell carrier, which, compared with the embodiment corresponding to FIG. 1D, ensures that the offset of the bandwidth part 1 is not required to be indicated relative to different synchronization signals for a terminal reading different synchronization signals and may effectively reduce processing complexity of the network device.

In the embodiment, the configuration information is obtained, the configuration information being used to configure the at least one frequency-domain bandwidth configuration, the size and/or position of the bandwidth part configured by each of the at least one frequency-domain bandwidth configuration being defined by adopting the same frequency-domain unit as the unit, the frequency-domain unit including the N RBs and N being an integer more than or equal to 1, and the configuration information is further sent. The size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby effectively ensuring a relatively low control signaling overhead and reducing device complexity.

In addition, with adoption of the technical solution provided in the disclosure, the size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby reducing processing complexity of a terminal.

Moreover, with adoption of the technical solutions provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce the control signaling overhead.

Furthermore, with adoption of the technical solution provided in the disclosure, the position of the bandwidth part may be configured by adopting the offset relative to the synchronization signal, and the terminal may obtain information about a position of a bandwidth part 1 without learning a system bandwidth, so that a control signaling overhead in notifying the terminal of the system bandwidth by the network device may be effectively reduced, and bandwidth part configuration flexibility is improved. Particularly for a terminal with a relatively small radio frequency bandwidth, the terminal is not required to search the position of the system bandwidth, so that a requirement on processing complexity of the terminal is also reduced, and reduction in cost and power consumption of the terminal is facilitated.

Figure 2:
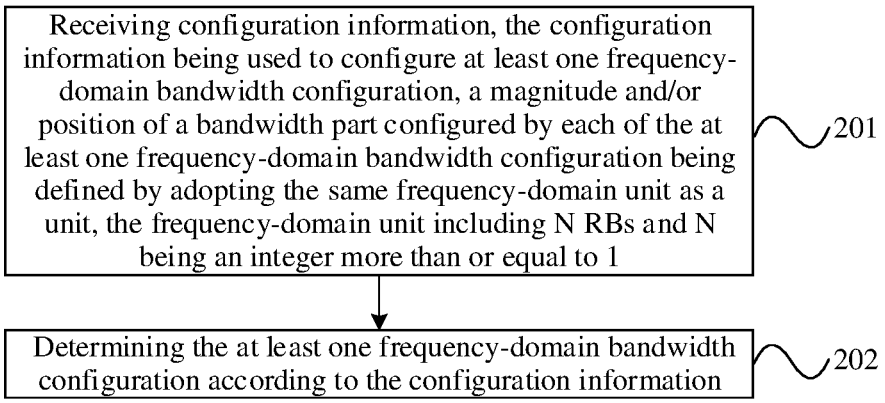
FIG. 2 is a flowchart of another bandwidth part configuration method according to another embodiment of the disclosure.

FIG. 2 is a flowchart of another bandwidth part configuration method according to another embodiment of the disclosure, as shown in FIG. 2.

In 201, configuration information is received, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N RBs and N being an integer more than or equal to 1.

In 202, the at least one frequency-domain bandwidth configuration is determined according to the configuration information.

It is to be noted that an execution body of 201-202 may be a terminal.

Optionally, in a possible implementation mode of the embodiment, the bandwidth part configured by each frequency-domain bandwidth configuration has the same subcarrier spacing or different subcarrier spacings. There are no particular limits made thereto in the embodiment.

In such a manner, different bandwidth parts may be switched to implement resource allocation of multiple subcarrier spacings.

Optionally, in a possible implementation mode of the embodiment, a subcarrier spacing of the RB may be any subcarrier spacing in the subcarrier spacings of the bandwidth part configured by each frequency-domain bandwidth configuration.

Optionally, in a possible implementation mode of the embodiment, the subcarrier spacing of the RB is a maximum subcarrier spacing in the subcarrier spacings of the bandwidth part configured by each frequency-domain bandwidth configuration.

Therefore, with adoption of the technical solutions provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce a control signaling overhead.

Optionally, in a possible implementation mode of the embodiment, the size of the bandwidth part configured by each frequency-domain bandwidth configuration may be the number of frequency-domain units D in the bandwidth part configured by the frequency-domain bandwidth configuration.

Optionally, in a possible implementation mode of the embodiment, the position of the bandwidth part configured by each frequency-domain bandwidth configuration is a relative offset of the bandwidth part configured by the frequency-domain bandwidth configuration relative to a synchronization signal or a cell carrier, the relative offset being defined by adopting the frequency-domain unit.

In such a manner, the position of the bandwidth part may be configured by adopting the offset relative to the synchronization signal, and the terminal may obtain information about a position of a bandwidth part 1 without learning a system bandwidth, so that a control signaling overhead in notifying the terminal of the system bandwidth by a network device may be effectively reduced, and bandwidth part configuration flexibility is improved. Particularly for a terminal with a relatively small radio frequency bandwidth, the terminal is not required to search the position of the system bandwidth, so that a requirement on processing complexity of the terminal is also reduced, and reduction in cost and power consumption of the terminal is facilitated.

In a specific implementation process, the relative offset may be an offset of a center frequency point, frequency-domain high end or frequency-domain low end of the bandwidth part configured by each frequency-domain bandwidth configuration relative to a center frequency point, frequency-domain high end or frequency-domain low end of the synchronization signal, for example, the offset of the center frequency point of the bandwidth part configured by each frequency-domain bandwidth configuration relative to the center frequency point of the synchronization signal, or, for another example, the offset of the center frequency point of the bandwidth part configured by each frequency-domain bandwidth configuration relative to the frequency-domain high end of the synchronization signal, or, for another example, the offset of the center frequency point of the bandwidth part configured by each frequency-domain bandwidth configuration relative to the frequency-domain low end of the synchronization signal, or, for another example, the offset of the frequency-domain high end of the bandwidth part configured by each frequency-domain bandwidth configuration relative to the center frequency point of the synchronization signal, or, for another example, the offset of the frequency-domain high end of the bandwidth part configured by each frequency-domain bandwidth configuration relative to the frequency-domain high end of the synchronization signal, or, for another example, the offset of the frequency-domain high end of the bandwidth part configured by each frequency-domain bandwidth configuration relative to the frequency-domain low end of the synchronization signal, or, for another example, the offset of the frequency-domain low end of the bandwidth part configured by each frequency-domain bandwidth configuration relative to the center frequency point of the synchronization signal, or, for another example, the offset of the frequency-domain low end of the bandwidth part configured by each frequency-domain bandwidth configuration relative to the frequency-domain high end of the synchronization signal, or, for another example, the offset of the frequency-domain low end of the bandwidth part configured by each frequency-domain bandwidth configuration relative to the frequency-domain low end of the synchronization signal.

In another specific implementation process, the relative offset may be an offset of the center frequency point, frequency-domain high end or frequency-domain low end of the bandwidth part configured by each frequency-domain bandwidth configuration relative to a center frequency point, frequency-domain high end or frequency-domain low end of the cell carrier, for example, the offset of the center frequency point of the bandwidth part configured by each frequency-domain bandwidth configuration relative to the center frequency point of the cell carrier, or, for another example, the offset of the center frequency point of the bandwidth part configured by each frequency-domain bandwidth configuration relative to the frequency-domain high end of the cell carrier, or, for another example, the offset of the center frequency point of the bandwidth part configured by each frequency-domain bandwidth configuration relative to the frequency-domain low end of the cell carrier, or, for another example, the offset of the frequency-domain high end of the bandwidth part configured by each frequency-domain bandwidth configuration relative to the center frequency point of the cell carrier, or, for another example, the offset of the frequency-domain high end of the bandwidth part configured by each frequency-domain bandwidth configuration relative to the frequency-domain high end of the cell carrier, or, for another example, the offset of the frequency-domain high end of the bandwidth part configured by each frequency-domain bandwidth configuration relative to the frequency-domain low end of the cell carrier, or, for another example, the offset of the frequency-domain low end of the bandwidth part configured by each frequency-domain bandwidth configuration relative to the center frequency point of the cell carrier, or, for another example, the offset of the frequency-domain low end of the bandwidth part configured by each frequency-domain bandwidth configuration relative to the frequency-domain high end of the cell carrier, or, for another example, the offset of the frequency-domain low end of the bandwidth part configured by each frequency-domain bandwidth configuration relative to the frequency-domain low end of the cell carrier.

Optionally, in a possible implementation mode of the embodiment, the configuration information received in 201 may further include at least one of:

serial number information of each frequency-domain bandwidth configuration; and information about the subcarrier spacings of the bandwidth part configured by each frequency-domain bandwidth configuration.

In an embodiment, the information about the subcarrier spacings of the bandwidth part configured by each frequency-domain bandwidth configuration may be information of serial numbers of the subcarrier spacings of the bandwidth part configured by each frequency-domain bandwidth configuration, or may also be information of a serial number of a parameter set of the bandwidth part configured by each frequency-domain bandwidth configuration, the parameter set of the bandwidth part configured by each frequency-domain bandwidth configuration at least including a subcarrier spacing and cyclic prefix of the bandwidth part configured by each frequency-domain bandwidth configuration, for example, a parameter set 1 (subcarrier spacing 1, cyclic prefix 1) and a parameter set 2 (subcarrier spacing 2, cyclic prefix 2). There are no particular limits made thereto in the embodiment.

Optionally, in a possible implementation mode of the embodiment, in 201, the configuration information sent through high-layer signaling or a system broadcast message may specifically be received.

In an embodiment, the terminal may specifically receive the configuration information sent by the network device through the high-layer signaling or the system broadcast message.

For example, the high-layer signaling may be an RRC message, and the configuration information may specifically be contained through an IE in the RRC message. The RRC message may be an RRC message in the conventional art, for example, an RRC connection reconfiguration message, and there are no limits made thereto in the embodiment. An IE of an existing RRC message is extended to contain the configuration information. Or the RRC message may also be different from the existing RRC message in the conventional art.

For another example, the high-layer signaling may be a MAC CE message, and a new MAC CE message may also specifically be added to contain the configuration information.

For another example, the configuration information may specifically be contained by a spare bit in an existing MIB or SIB in the system broadcast message, and a new SIB may also be added to contain the configuration information.

It can be understood that high-layer signaling or system broadcast message involved in the subsequent embodiments may all be understood in the same manner.

Optionally, in a possible implementation mode of the embodiment, first indication information may further be received, the first indication information including information of a serial number indicating one frequency-domain bandwidth configuration in the at least one frequency-domain bandwidth configuration. Therefore, the specific frequency-domain bandwidth configuration may be indicated to the terminal.

In an embodiment, the first indication information sent through high-layer signaling or a system broadcast message or DCI may specifically be received.

Optionally, in a possible implementation mode of the embodiment, second indication information may further be received, the second indication information including frequency-domain resource allocation information based on one frequency-domain bandwidth configuration in the at least one frequency-domain bandwidth configuration. Therefore, specific frequency-domain resource allocation information of the specific frequency-domain bandwidth configuration may be indicated to the terminal.

In an embodiment, the second indication information sent through high-layer signaling or a system broadcast message or DCI may specifically be received.

For making the method provided in the embodiment of the disclosure clearer, similarly, related contents in the embodiment corresponding to FIG. 1A-FIG. 1E may also be referred to and elaborations are omitted herein.

In the embodiment, the configuration information is received, the configuration information being used to configure the at least one frequency-domain bandwidth configuration, the size and/or position of the bandwidth part configured by each of the at least one frequency-domain bandwidth configuration being defined by adopting the same frequency-domain unit as the unit, the frequency-domain unit including the N RBs and N being an integer more than or equal to 1, and the at least one frequency-domain bandwidth configuration is further determined according to the configuration information. The size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby effectively ensuring a relatively low control signaling overhead and reducing device complexity.

In addition, with adoption of the technical solution provided in the disclosure, the size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby reducing processing complexity of a terminal.

Moreover, with adoption of the technical solution provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce the control signaling overhead.

Furthermore, with adoption of the technical solution provided in the disclosure, the position of the bandwidth part may be configured by adopting the offset relative to the synchronization signal, and the terminal may obtain information about the position of the bandwidth part 1 without learning the system bandwidth, so that a control signaling overhead in notifying the terminal of the system bandwidth by the network device may be effectively reduced, and bandwidth part configuration flexibility is improved. Particularly for a terminal with a relatively small radio frequency bandwidth, the terminal is not required to search the position of the system bandwidth, so that a requirement on processing complexity of the terminal is also reduced, and reduction in cost and power consumption of the terminal is facilitated.

It is to be noted that, for simple description, each method embodiment is expressed into a combination of a series of actions. However, those skilled in the art should know that the disclosure is not limited by an action sequence described herein because some operations may be executed in another sequence or at the same time according to the disclosure. Second, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

Figure 3:
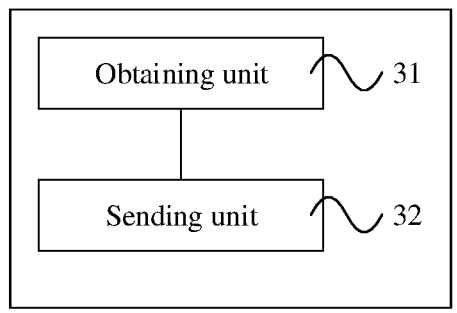
FIG. 3 is a structure diagram of a network device according to another embodiment of the disclosure.

FIG. 3 is a structure diagram of a network device according to another embodiment of the disclosure, as shown in FIG. 3. The network device of the embodiment may include an obtaining unit 31 and a sending unit 32. The obtaining unit 31 is configured to obtain configuration information, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N RBs and N being an integer more than or equal to 1. The sending unit 32 is configured to send the configuration information.

Optionally, in a possible implementation mode of the embodiment, the bandwidth part configured by each frequency-domain bandwidth configuration has the same subcarrier spacing or different subcarrier spacings. There are no particular limits made thereto in the embodiment.

In such a manner, different bandwidth parts may be switched to implement resource allocation of multiple subcarrier spacings.

Optionally, in a possible implementation mode of the embodiment, a subcarrier spacing of the RB may be any subcarrier spacing in the subcarrier spacings of the bandwidth part configured by each frequency-domain bandwidth configuration.

Optionally, in a possible implementation mode of the embodiment, the subcarrier spacing of the RB is a maximum subcarrier spacing in the subcarrier spacings of the bandwidth part configured by each frequency-domain bandwidth configuration.

Therefore, with adoption of the technical solutions provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce a control signaling overhead.

Optionally, in a possible implementation mode of the embodiment, the size of the bandwidth part configured by each frequency-domain bandwidth configuration may be the number of frequency-domain units D in the bandwidth part configured by the frequency-domain bandwidth configuration.

Optionally, in a possible implementation mode of the embodiment, the position of the bandwidth part configured by each frequency-domain bandwidth configuration is a relative offset of the bandwidth part configured by the frequency-domain bandwidth configuration relative to a synchronization signal or a cell carrier, the relative offset being defined by adopting the frequency-domain unit.

In a specific implementation process, the relative offset may be an offset of a center frequency point, frequency-domain high end or frequency-domain low end of the bandwidth part configured by each frequency-domain bandwidth configuration relative to a center frequency point, frequency-domain high end or frequency-domain low end of the synchronization signal, In another specific implementation process, the relative offset may be an offset of the center frequency point, frequency-domain high end or frequency-domain low end of the bandwidth part configured by each frequency-domain bandwidth configuration relative to a center frequency point, frequency-domain high end or frequency-domain low end of the cell carrier, Optionally, in a possible implementation mode of the embodiment, the configuration information obtained by the obtaining unit 21 may further include at least one of:

serial number information of each frequency-domain bandwidth configuration; and information about the subcarrier spacings of the bandwidth part configured by each frequency-domain bandwidth configuration.

In an embodiment, the information about the subcarrier spacings of the bandwidth part configured by each frequency-domain bandwidth configuration may be information of serial numbers of the subcarrier spacings of the bandwidth part configured by each frequency-domain bandwidth configuration, or may also be information of a serial number of a parameter set of the bandwidth part configured by each frequency-domain bandwidth configuration, the parameter set of the bandwidth part configured by each frequency-domain bandwidth configuration at least including a subcarrier spacing and cyclic prefix of the bandwidth part configured by each frequency-domain bandwidth configuration, for example, a parameter set 1 (subcarrier spacing 1, cyclic prefix 1) and a parameter set 2 (subcarrier spacing 2, cyclic prefix 2). There are no particular limits made thereto in the embodiment.

Optionally, in a possible implementation mode of the embodiment, the sending unit 22 may specifically be configured to send the configuration information through high-layer signaling or a system broadcast message.

Optionally, in a possible implementation mode of the embodiment, the sending unit 22 may further be configured to send first indication information, the first indication information including information of a serial number indicating one frequency-domain bandwidth configuration in the at least one frequency-domain bandwidth configuration.

In an embodiment, the sending unit 22 may specifically be configured to send the first indication information through high-layer signaling or a system broadcast message or DCI.

Optionally, in a possible implementation mode of the embodiment, the sending unit 22 may further be configured to send second indication information, the second indication information including frequency-domain resource allocation information based on one frequency-domain bandwidth configuration in the at least one frequency-domain bandwidth configuration.

In an embodiment, the sending unit 22 may specifically be configured to send the second indication information through high-layer signaling or a system broadcast message or DCI.

It is to be noted that the method in the embodiment corresponding to FIG. 1A-FIG. 1E may be implemented by the network device provided in the embodiment. Detailed descriptions may refer to related contents in the embodiment corresponding to FIG. 1A-FIG. 1E and elaborations are omitted herein.

In the embodiment, the configuration information is obtained through the obtaining unit, the configuration information being used to configure the at least one frequency-domain bandwidth configuration, the size and/or position of the bandwidth part configured by each of the at least one frequency-domain bandwidth configuration being defined by adopting the same frequency-domain unit as the unit, the frequency-domain unit including the N RBs and N being an integer more than or equal to 1, and the configuration information is further sent through the sending unit. The size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby effectively ensuring a relatively low control signaling overhead and reducing device complexity.

In addition, with adoption of the technical solution provided in the disclosure, the size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby reducing processing complexity of a terminal.

Moreover, with adoption of the technical solution provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce the control signaling overhead.

Furthermore, with adoption of the technical solution provided in the disclosure, the position of the bandwidth part may be configured by adopting the offset relative to the synchronization signal, and a terminal may obtain information about a position of a bandwidth part 1 without learning a system bandwidth, so that a control signaling overhead in notifying the terminal of the system bandwidth by the network device may be effectively reduced, and bandwidth part configuration flexibility is improved. Particularly for a terminal with a relatively small radio frequency bandwidth, the terminal is not required to search the position of the system bandwidth, so that a requirement on processing complexity of the terminal is also reduced, and reduction in cost and power consumption of the terminal is facilitated.

Figure 4:
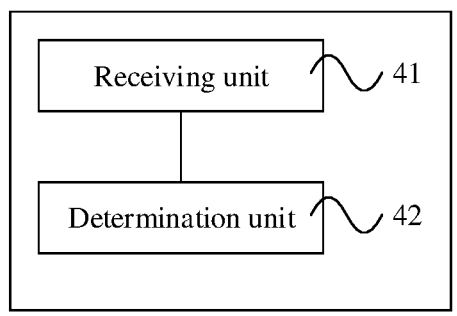
FIG. 4 is a structure diagram of a terminal according to another embodiment of the disclosure.

FIG. 4 is a structure diagram of a terminal according to another embodiment of the disclosure, as shown in FIG. 4. The network device of the embodiment may include a receiving unit 41 and a determination unit 42. The receiving unit 41 is configured to receive configuration information, the configuration information being used to configure at least one frequency-domain bandwidth configuration, a size and/or position of a bandwidth part configured by each of the at least one frequency-domain bandwidth configuration being defined by adopting the same frequency-domain unit as a unit, the frequency-domain unit including N RBs and N being an integer more than or equal to 1. The determination unit 42 is configured to determine the at least one frequency-domain bandwidth configuration according to the configuration information.

Optionally, in a possible implementation mode of the embodiment, the bandwidth part configured by each frequency-domain bandwidth configuration has the same subcarrier spacing or different subcarrier spacings. There are no particular limits made thereto in the embodiment.

In such a manner, different bandwidth parts may be switched to implement resource allocation of multiple subcarrier spacings.

Optionally, in a possible implementation mode of the embodiment, a subcarrier spacing of the RB may be any subcarrier spacing in the subcarrier spacings of the bandwidth part configured by each frequency-domain bandwidth configuration.

Optionally, in a possible implementation mode of the embodiment, the subcarrier spacing of the RB is a maximum subcarrier spacing in the subcarrier spacings of the bandwidth part configured by each frequency-domain bandwidth configuration.

Therefore, with adoption of the technical solutions provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce a control signaling overhead.

Optionally, in a possible implementation mode of the embodiment, the size of the bandwidth part configured by each frequency-domain bandwidth configuration may be the number of frequency-domain units D in the bandwidth part configured by the frequency-domain bandwidth configuration.

Optionally, in a possible implementation mode of the embodiment, the position of the bandwidth part configured by each frequency-domain bandwidth configuration is a relative offset of the bandwidth part configured by the frequency-domain bandwidth configuration relative to a synchronization signal or a cell carrier, the relative offset being defined by adopting the frequency-domain unit.

In a specific implementation process, the relative offset may be an offset of a center frequency point, frequency-domain high end or frequency-domain low end of the bandwidth part configured by each frequency-domain bandwidth configuration relative to a center frequency point, frequency-domain high end or frequency-domain low end of the synchronization signal.

In another specific implementation process, the relative offset may be an offset of the center frequency point, frequency-domain high end or frequency-domain low end of the bandwidth part configured by each frequency-domain bandwidth configuration relative to a center frequency point, frequency-domain high end or frequency-domain low end of the cell carrier.

Optionally, in a possible implementation mode of the embodiment, the configuration information received by the receiving unit 41 may further include at least one of:

serial number information of each frequency-domain bandwidth configuration; and information about the subcarrier spacings of the bandwidth part configured by each frequency-domain bandwidth configuration.

In an embodiment, the information about the subcarrier spacings of the bandwidth part configured by each frequency-domain bandwidth configuration may be information of serial numbers of the subcarrier spacings of the bandwidth part configured by each frequency-domain bandwidth configuration, or may also be information of a serial number of a parameter set of the bandwidth part configured by each frequency-domain bandwidth configuration, the parameter set of the bandwidth part configured by each frequency-domain bandwidth configuration at least including a subcarrier spacing and cyclic prefix of the bandwidth part configured by each frequency-domain bandwidth configuration, for example, a parameter set 1 (subcarrier spacing 1, cyclic prefix 1) and a parameter set 2 (subcarrier spacing 2, cyclic prefix 2). There are no particular limits made thereto in the embodiment.

Optionally, in a possible implementation mode of the embodiment, the receiving unit 31 may specifically be configured to receive the configuration information sent through high-layer signaling or a system broadcast message.

Optionally, in a possible implementation mode of the embodiment, the receiving unit 31 may further be configured to receive first indication information, the first indication information including information of a serial number indicating one frequency-domain bandwidth configuration in the at least one frequency-domain bandwidth configuration.

In an embodiment, the receiving unit 31 may specifically be configured to receive the first indication information sent through high-layer signaling or a system broadcast message or DCI.

Optionally, in a possible implementation mode of the embodiment, the receiving unit 31 may further be configured to receive second indication information, the second indication information including frequency-domain resource allocation information based on one frequency-domain bandwidth configuration in the at least one frequency-domain bandwidth configuration.

In an embodiment, the receiving unit 31 may specifically be configured to receive the second indication information sent through high-layer signaling or a system broadcast message or DCI.

It is to be noted that the method in the embodiment corresponding to FIG. 2 may be implemented by the terminal provided in the embodiment. Detailed descriptions may refer to related contents in the embodiment corresponding to FIG. 2 and elaborations are omitted herein.

In the embodiment, the configuration information is received through the receiving unit, the configuration information being used to configure the at least one frequency-domain bandwidth configuration, the size and/or position of the bandwidth part configured by each of the at least one frequency-domain bandwidth configuration being defined by adopting the same frequency-domain unit as the unit, the frequency-domain unit including the N RBs and N being an integer more than or equal to 1, and the at least one frequency-domain bandwidth configuration is further determined through the determination unit according to the configuration information. The size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby effectively ensuring a relatively low control signaling overhead and reducing device complexity.

In addition, with adoption of the technical solution provided in the disclosure, the size and/or position of the bandwidth part configured by each frequency-domain bandwidth configuration are/is defined by adopting the same frequency-domain unit as the unit, which, compared with configuration of bandwidth parts by adopting different resource granularities, may unify control signaling structures, thereby reducing processing complexity of a terminal.

Moreover, with adoption of the technical solution provided in the disclosure, the maximum subcarrier spacing in the subcarrier spacings of the bandwidth parts configured by each frequency-domain bandwidth configuration is adopted as the subcarrier spacing of the RB, which, compared with adoption of a relatively small subcarrier spacing as the subcarrier spacing of the RB, may effectively reduce a bit number for configuration of the bandwidth parts and reduce the control signaling overhead.

Furthermore, with adoption of the technical solution provided in the disclosure, the position of the bandwidth part may be configured by adopting the offset relative to the synchronization signal, and the terminal may obtain information about a position of a bandwidth part 1 without learning a system bandwidth, so that a control signaling overhead in notifying the terminal of the system bandwidth by the network device may be effectively reduced, and bandwidth part configuration flexibility is improved. Particularly for a terminal with a relatively small radio frequency bandwidth, the terminal is not required to search the position of the system bandwidth, so that a requirement on processing complexity of the terminal is also reduced, and reduction in cost and power consumption of the terminal is facilitated.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The integrated unit may be implemented in a hardware form and may also be implemented in form of hardware and software functional unit.

It is finally to be noted that: the above embodiments are adopted not to limit but only to describe the technical solutions of the disclosure; although the disclosure is described with reference to the embodiments in detail, those of ordinary skill in the art should know that modifications may also be made to the technical solutions recorded in each embodiment or equivalent replacements may be made to part of technical features therein; and these modifications or replacements do not make the essence of the corresponding technical solutions depart from the spirit and scope of the technical solutions of each embodiment of the disclosure.

The invention claimed is:

1. A method for bandwidth part configuration, comprising:
receiving configuration information, the configuration information being used to configure a plurality of frequency-domain bandwidth configurations, each of the plurality of frequency-domain bandwidth configurations being used to configure a respective bandwidth part, wherein a size and a position of each of a plurality of bandwidth parts configured by the plurality of frequency-domain bandwidth configurations are defined by adopting a same frequency-domain unit as a unit, the frequency-domain unit comprising one Resource Block (RB); and
determining the plurality of frequency-domain bandwidth configurations according to the configuration information;
wherein the configuration information comprises configurations of subcarrier spacings of the bandwidth parts;
wherein each of the plurality of bandwidth parts is configured to have a same subcarrier spacing.

2. The method of claim 1, wherein
a subcarrier spacing of the RB is any subcarrier spacing in the subcarrier spacings of the bandwidth parts; or
the subcarrier spacing of the RB is a maximum subcarrier spacing in the subcarrier spacings of the bandwidth parts.

3. The method of claim 1, wherein the size of each of the bandwidth parts is a number of frequency-domain units in the bandwidth part.

4. The method of claim 1, wherein the position of each of the bandwidth parts is a relative offset of the bandwidth part configured by a corresponding frequency-domain bandwidth configuration relative to a synchronization signal or a cell carrier, the relative offset being defined by adopting the frequency-domain unit.

5. The method of claim 4, wherein the relative offset comprises:

an offset of a frequency-domain low end of the bandwidth part relative to a frequency-domain low end of the synchronization signal; or an offset of the frequency-domain low end of the bandwidth part relative to a frequency-domain low end of the cell carrier.

6. The method of claim 1, wherein the configuration information further comprises at least one of:
serial number information of each of the plurality of frequency-domain bandwidth configurations; and
information about the subcarrier spacings of the bandwidth parts,
wherein information about the subcarrier spacings of the bandwidth parts comprises:
information of serial numbers of the subcarrier spacings of the bandwidth parts; or
information of a serial number of a parameter set of each of the bandwidth parts, the parameter set of each of the bandwidth parts at least comprising a subcarrier spacing and cyclic prefix of the bandwidth part.

7. The method of claim 1, wherein receiving the configuration information comprises:
receiving the configuration information sent through high-layer signaling or a system broadcast message.

8. The method of claim 1, further comprising:
receiving first indication information, the first indication information comprising information of a serial number indicating one frequency-domain bandwidth configuration in the plurality of frequency-domain bandwidth configurations,
wherein receiving the first indication information comprises:
receiving the first indication information sent through high-layer signaling or a system broadcast message or Downlink Control Information (DCI).

9. The method of claim 1, further comprising:
receiving second indication information, the second indication information comprising frequency-domain resource allocation information based on one frequency-domain bandwidth configuration in the plurality of frequency-domain bandwidth configurations,
wherein receiving the second indication information comprises:
receiving the second indication information sent through high-layer signaling or a system broadcast message or Downlink Control Information (DCI).

10. A network device, comprising:
a processor, configured to obtain configuration information, the configuration information being used to configure a plurality of frequency-domain bandwidth configurations, each of the plurality of frequency-domain bandwidth configurations being used to configure a respective bandwidth part, wherein a size and a position of each of a plurality of bandwidth parts configured by the plurality of frequency-domain bandwidth configurations are defined by adopting a same frequency-domain unit as a unit, the frequency-domain unit comprising one Resource Block (RB), wherein the configuration information comprises configurations of subcarrier spacings of the bandwidth parts, and each of the plurality of bandwidth parts is configured to have a same subcarrier spacing; and
a transceiver, configured to send the configuration information.

11. The network device of claim 10, wherein
a subcarrier spacing of the RB is any subcarrier spacing in the subcarrier spacings of the bandwidth parts; or
the subcarrier spacing of the RB is a maximum subcarrier spacing in the subcarrier spacings of the bandwidth parts.

12. The network device of claim 10, wherein the size of each of the bandwidth parts is a number of frequency-domain units in the bandwidth part configured by the frequency-domain bandwidth configuration.

13. The network device of claim 10, wherein the position of each of the bandwidth parts is a relative offset of the bandwidth part configured by a corresponding frequency-domain bandwidth configuration relative to a synchronization signal or a cell carrier, the relative offset being defined by adopting the frequency-domain unit.

14. The network device of claim 13, wherein the relative offset comprises:
an offset of a frequency-domain low end of the bandwidth part relative to a frequency-domain low end of the synchronization signal; or
an offset of the frequency-domain low end of the bandwidth part relative to a frequency-domain low end of the cell carrier.

15. The network device of claim 10, wherein the configuration information further comprises at least one of:
serial number information of each of the plurality of frequency-domain bandwidth configurations; and
information about the subcarrier spacings of the bandwidth parts,
wherein information about the subcarrier spacings of the bandwidth parts comprises:
information of serial numbers of the subcarrier spacings of the bandwidth parts; or
information of a serial number of a parameter set of each of the bandwidth parts, the parameter set of each of the bandwidth parts at least comprising a subcarrier spacing and cyclic prefix of the bandwidth part.

16. The network device of claim 10, wherein the transceiver is specifically configured to:
send the configuration information through high-layer signaling or a system broadcast message.

17. The network device of claim 10, wherein the transceiver is further configured to:
send first indication information, the first indication information comprising information of a serial number indicating one frequency-domain bandwidth configuration in the plurality of frequency-domain bandwidth configurations,
wherein the sending unit is specifically configured to:
send the first indication information through high-layer signaling or a system broadcast message or Downlink Control Information (DCI).

18. The network device of claim 10, wherein the transceiver is further configured to:
send second indication information, the second indication information comprising frequency-domain resource allocation information based on one frequency-domain bandwidth configuration in the plurality of frequency-domain bandwidth configurations,
wherein the transceiver is specifically configured to:
send the second indication information through high-layer signaling or a system broadcast message or Downlink Control Information (DCI).

19. A terminal, comprising:
a transceiver, configured to receive configuration information, the configuration information being used to configure a plurality of frequency-domain bandwidth configurations, each of the plurality of frequency-domain bandwidth configurations being used to configure a respective bandwidth part, wherein a size and a position of each of a plurality of bandwidth parts configured by the plurality of frequency-domain bandwidth configurations are defined by adopting a same frequency-domain unit as a unit, the frequency-domain unit comprising one Resource Block (RB); and a processor, configured to determine the plurality of frequency-domain bandwidth configurations according to the configuration information, wherein the configuration information comprises configurations of subcarrier spacings of the bandwidth parts, and each of the plurality of bandwidth parts is configured to have a same subcarrier spacing.

20. The terminal of claim 19, wherein
a subcarrier spacing of the RB is any subcarrier spacing in the subcarrier spacings of the bandwidth parts; or
the subcarrier spacing of the RB is a maximum subcarrier spacing in the subcarrier spacings of the bandwidth parts.

21. The terminal of claim 19, wherein the size of each of the bandwidth parts is a number of frequency-domain units in the bandwidth part configured by a corresponding frequency-domain bandwidth configuration.

22. The terminal of claim 19, wherein the position of each of the bandwidth parts is a relative offset of the bandwidth part configured by a corresponding frequency-domain bandwidth configuration relative to a synchronization signal or a cell carrier, the relative offset being defined by adopting the frequency-domain unit.

23. The terminal of claim 22, wherein the relative offset comprises:
an offset of a frequency-domain low end of the bandwidth part relative to a frequency-domain low end of the synchronization signal; or
an offset of the frequency-domain low end of the bandwidth part relative to a frequency-domain low end of the cell carrier.

24. The terminal of claim 19, wherein the configuration information further comprises at least one of:
serial number information of each of the plurality of frequency-domain bandwidth configurations; and
information about the subcarrier spacings of the bandwidth parts,
wherein information about the subcarrier spacings of the bandwidth part comprises:
information of serial numbers of the subcarrier spacings of the bandwidth part; or
information of a serial number of a parameter set of each of the bandwidth parts, the parameter set of each of the bandwidth parts at least comprising a subcarrier spacing and cyclic prefix of the bandwidth part.

25. The terminal of claim 19, wherein the transceiver is configured to:
receive the configuration information sent through high-layer signaling or a system broadcast message.

26. The terminal of claim 19, wherein the transceiver is further configured to:
receive first indication information, the first indication information comprising information of a serial number indicating one frequency-domain bandwidth configuration in the plurality of frequency-domain bandwidth configurations,
wherein the receiving unit is configured to:
receive the first indication information sent through high-layer signaling or a system broadcast message or Downlink Control Information (DCI).

27. The terminal of claim 19, wherein the transceiver is further configured to:
receive second indication information, the second indication information comprising frequency-domain resource allocation information based on one frequency-domain bandwidth configuration in the plurality of frequency-domain bandwidth configurations,
wherein the receiving unit is configured to:
receive the second indication information sent through high-layer signaling or a system broadcast message or Downlink Control Information (DCI).

* * * * *